United States Patent
Egelja et al.

(10) Patent No.: US 7,260,931 B2
(45) Date of Patent: Aug. 28, 2007

(54) MULTI-ACTUATOR PRESSURE-BASED FLOW CONTROL SYSTEM

(75) Inventors: Aleksandar M. Egelja, Naperville, IL (US); Shoji Tozawa, Kobe (JP); Michael T. Verkuilen, Metamora, IL (US)

(73) Assignees: Caterpillar Inc., Peoria, IL (US); Shin Caterpillar Mitsubishi Ltd. (JP)

( * ) Notice: Subject to any disclaimer, the term of this patent is extended or adjusted under 35 U.S.C. 154(b) by 0 days.

(21) Appl. No.: 11/287,342

(22) Filed: Nov. 28, 2005

(65) Prior Publication Data
US 2007/0119159 A1    May 31, 2007

(51) Int. Cl.
*F15B 11/16* (2006.01)
*F15B 21/08* (2006.01)
*E02F 9/22* (2006.01)

(52) U.S. Cl. .......................................... 60/422; 60/426
(58) Field of Classification Search ................... 60/420, 60/422, 428, 484, 486; 700/282
See application file for complete search history.

(56) References Cited

U.S. PATENT DOCUMENTS

| | | |
|---|---|---|
| 4,528,892 A | 7/1985 | Okabe et al. |
| 4,938,023 A | 7/1990 | Yoshino |
| 5,285,642 A | 2/1994 | Watanabe et al. |
| 5,333,450 A | 8/1994 | Blendinger et al. |
| 5,347,811 A | 9/1994 | Hasegawa et al. |
| 5,642,616 A | 7/1997 | Park |
| 5,752,384 A | 5/1998 | Schmitt et al. |
| 6,216,456 B1 | 4/2001 | Mitchell |
| 6,282,891 B1 * | 9/2001 | Rockwood .................... 60/422 |
| 6,393,838 B1 * | 5/2002 | Moriya et al. ................ 60/422 |
| 6,498,973 B2 * | 12/2002 | Dix et al. ..................... 60/428 |
| 6,623,247 B2 | 9/2003 | Du |
| 6,662,558 B1 | 12/2003 | Nelson |

* cited by examiner

*Primary Examiner*—Thomas E. Lazo
(74) *Attorney, Agent, or Firm*—Finnegan, Henderson, Farabow, Garrett & Dunner

(57) ABSTRACT

A hydraulic control system for a work machine is disclosed. The hydraulic control system has a fluid actuator, a supply of pressurized fluid, and a control valve movable to selectively pass pressurized fluid to the fluid actuator. The hydraulic control system also has a sensor configured to sense the pressure of the pressurized fluid passed to the fluid actuator and a controller in communication with the control valve and the sensor. The controller is configured to receive an input indicative of a desired velocity of the fluid actuator and to determine a fluid flow rate corresponding to the desired velocity. The controller is also configured to determine a ratio of the sensed pressure to a stall pressure of the supply and to scale down the determined flow rate an amount based on the determined ratio. The controller is further configured to move the control valve an amount corresponding to the scaled down flow rate.

21 Claims, 4 Drawing Sheets

MULTI-ACTUATOR PRESSURE-BASED FLOW CONTROL SYSTEM

TECHNICAL FIELD

The present disclosure relates generally to a multi-actuator flow control system, and more particularly, to a multi-actuator flow control system that is pressure based.

BACKGROUND

Work machines such as, for example, excavators, loaders, dozers, motor graders, and other types of heavy machinery use multiple actuators supplied with hydraulic fluid from a common pump on the work machine to accomplish a variety of tasks. These actuators are typically velocity controlled based on an actuation position of one or more operator interface devices. For example, an operator interface device such as a joystick, a pedal, or any other suitable operator interface device may be movable to generate a signal indicative of a desired velocity of an associated hydraulic actuator. When an operator moves the interface device, the operator expects the hydraulic actuator to move at a corresponding predetermined velocity. However, when the movement of one of the actuators is restricted by an external load, the pressure of the fluid moving the actuator may rise abruptly. Similarly, when movement of an actuator associated with a heavy work implement is initiated, the pressure of the fluid moving the actuator may also rise abruptly due to inertia of the heavy work implement. These abrupt rises in pressure may reduce fine controllability of the actuators and produce actuator velocities that are unexpected and/or undesired. In addition, because the pressure of the fluid supplied to all of the actuators is controlled by the single highest pressure of any one actuator, during these situations of abrupt pressure rises, the fluid supply to and the velocity of all of the actuators will be reduced.

One method of improving controllability and predictability of actuator movement is described in U.S. Pat. No. 4,938,023 (the '023 patent) issued to Yoshino on Jul. 3, 1990. The '023 patent describes a fluid pressure control system for a hydraulic excavator. The fluid pressure control system has a first selector valve for controlling the movement of a first actuator, and a second selector valve for controlling the movement of a second actuator. The first and second selector valves are pilot operated. A variable relief valve is fluidly connected between the first actuator, the first selector valve, and a tank to relieve and thereby vary the pressure of the fluid supplied to the first actuator in response to the pilot pressure supplied to the first selector valve. For example, if the pilot pressure supplied to the first selector valve is low, the pressure relief setting associated with the first actuator is low. Likewise, if the pilot pressure supplied to the first selector valve is high, the pressure relief setting associated with the first actuator is high. This variable relief setting functions to relate the magnitude of actuator pressure to pilot pressure directly controlled by the operator, thereby giving the operator more control over movement of the first actuator and associated heavy or movement-restricted work tool.

In addition, the fluid pressure control system of the '023 patent may include a third selector valve operated by the same pilot fluid that operates the second selector valve. The third selector valve may function to block feedback from the first (high inertia) actuator to a common supply pump when the second actuator is operated. In this manner, an abrupt rise in pressure associated with the first actuator will not reduce the flow of pressurized fluid to the second actuator and the resulting velocity of the second actuator.

Although the fluid pressure control system of the '023 patent may improve controllability and predictability of fluid actuator velocity, it may be inefficient and limited. In particular, because the fluid pressure control system of the '023 patent improves controllability by relieving pressurized fluid to a tank, the work associated with pressurizing the relieved fluid may be lost, thereby reducing the efficiency of the hydraulic excavator. Further, because any operation of the second actuator, regardless of magnitude, blocks feedback from the first actuator to the common pump, the pump of the '023 patent may be inefficiently operated during minor operations of the second actuator. In addition, because the fluid pressure control system of the '023 patent is purely hydro-mechanical, tunability of the system may be limited.

The disclosed control system is directed to overcoming one or more of the problems set forth above.

SUMMARY OF THE INVENTION

In one aspect, the present disclosure is directed to a hydraulic control system. The hydraulic control system includes a fluid actuator, a supply of pressurized fluid, and a control valve movable to selectively pass pressurized fluid from the supply to the fluid actuator. The hydraulic control system also includes a sensor configured to sense the pressure of the pressurized fluid passed to the fluid actuator, and a controller in communication with the control valve and the sensor. The controller is configured to receive an input indicative of a desired velocity of the fluid actuator and to determine a fluid flow rate corresponding to the desired velocity. The controller is also configured to determine a ratio of the sensed pressure to a stall pressure of the supply and to scale down the determined flow rate an amount based on the determined ratio. The controller is further configured to move the control valve an amount corresponding to the scaled down flow rate.

In another aspect, the present disclosure is directed to a method of operating a hydraulic control system. The method includes pressurizing a fluid, directing the pressurized fluid to a fluid actuator, and sensing the pressure of the fluid directed to the fluid actuator. The method also includes receiving an input indicative of a desired velocity of the fluid actuator and determining a fluid flow rate corresponding to the desired flow rate. The method further includes determining a ratio of the sensed pressure to a stall pressure and scaling down the determined flow rate an amount based on the determined ratio. The method additionally includes moving a control valve associated with the fluid actuator an amount corresponding to the scaled down flow rate.

DETAILED DESCRIPTION

Figure 1:
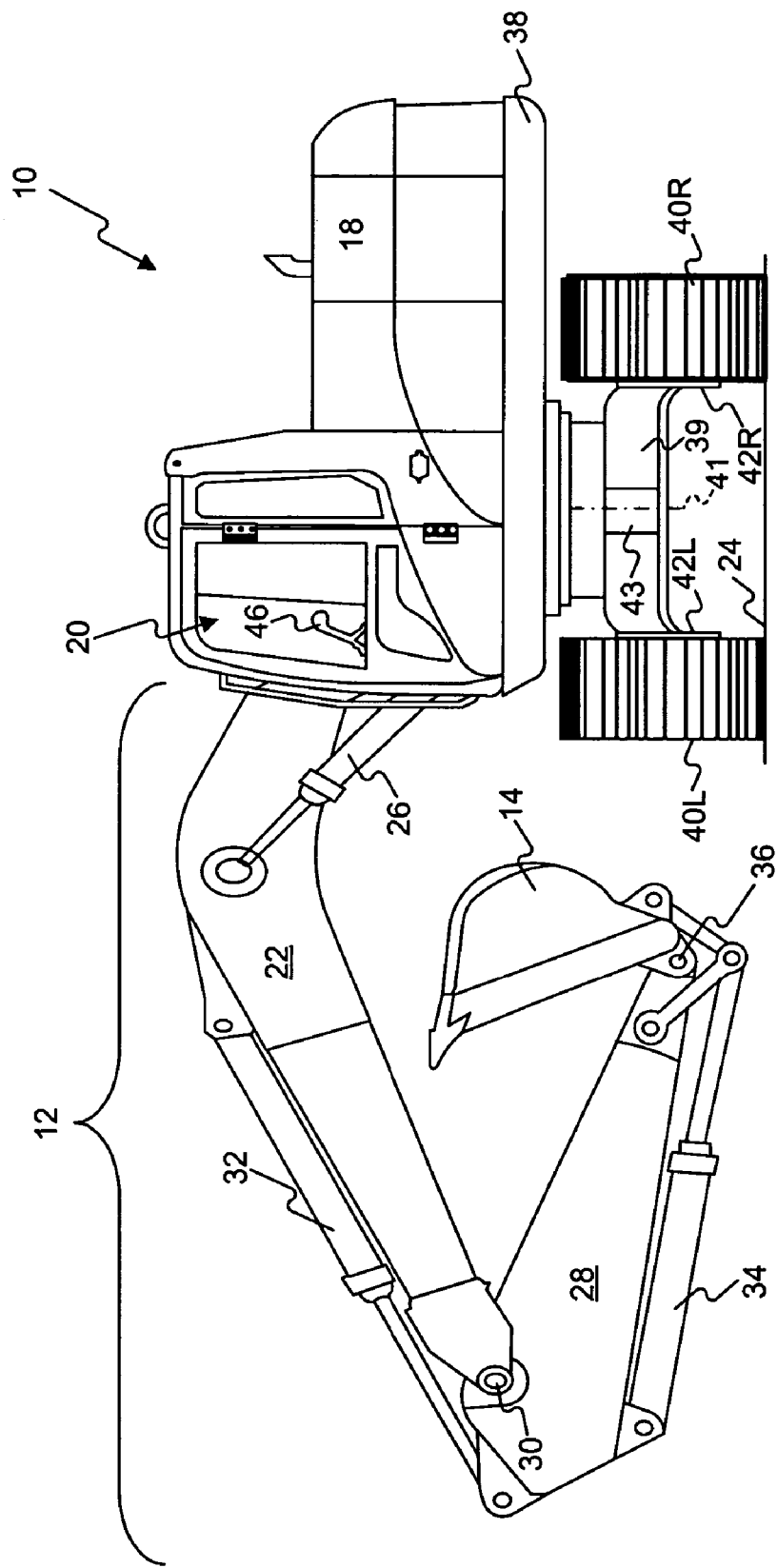
FIG. 1 is a side-view diagrammatic illustration of an exemplary disclosed work machine.

FIG. 1 illustrates an exemplary work machine 10 having multiple systems and components that cooperate to accomplish a task. Work machine 10 may embody a fixed or mobile machine that performs some type of operation associated with an industry such as mining, construction, farming, transportation, or any other industry known in the art. For example, work machine 10 may be an earth moving machine such as an excavator, a dozer, a loader, a backhoe, a motor grader, a haul truck, or any other earth moving machine. Work machine 10 may include an implement system 12 configured to move a work tool 14, a drive system 16 for propelling work machine 10, a power source 18 that provides power to implement system 12 and drive system 16, and an operator station 20 for operator control of implement and drive systems 12, 16.

Implement system 12 may include a linkage structure moved by fluid actuators to position and operate work tool 14. Specifically, implement system 12 may include a boom member 22 vertically pivotal about an axis (not shown) relative to a work surface 24 by a pair of adjacent, double-acting, hydraulic cylinders 26 (only one shown in FIG. 1). Implement system 12 may also include a stick member 28 vertically pivotal about an axis 30 by a single, double-acting, hydraulic cylinder 32. Implement system 12 may further include a single, double-acting, hydraulic cylinder 34 operatively connected to work tool 14 to pivot work tool 14 vertically about a pivot axis 36. Boom member 22 may be pivotally connected to a frame member 38 of work machine 10. Frame member 38 may be pivoted relative to an undercarriage member 39 about a vertical axis 41 by a hydraulic swing motor 43. Stick member 28 may pivotally connect boom member 22 to work tool 14 by way of pivot axis 30 and 36. It is contemplated that a greater or lesser number of fluid actuators may be included within implement system 12 and connected in a manner other than described above.

Each of hydraulic cylinders 26, 32, 34 may include a tube and a piston assembly (not shown) arranged to form two separated pressure chambers. The pressure chambers may be selectively supplied with pressurized fluid and drained of the pressurized fluid to cause the piston assembly to displace within the tube, thereby changing the effective length of hydraulic cylinders 26, 32, 34. The flow rate of fluid into and out of the pressure chambers may relate to a velocity of hydraulic cylinders 26, 32, 34, while a pressure differential between the two pressure chambers may relate to a force imparted by hydraulic cylinders 26, 32, 34 on the associated linkage members. The expansion and retraction of hydraulic cylinders 26, 32, 34 may assist in moving work tool 14.

Numerous different work tools 14 may be attachable to a single work machine 10 and controllable via operator station 20. Work tool 14 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Although connected in the embodiment of FIG. 1 to pivot relative to work machine 10, work tool 14 may alternatively or additionally rotate, slide, swing, lift, or move in any other manner known in the art.

Swing motor 43 may be driven by a fluid pressure differential. Specifically, swing motor 43 may include first and second chambers (not shown) located to either side of an impeller (not shown). When the first chamber is filled with pressurized fluid and the second chamber is drained of fluid, the impeller may be urged to rotate in a first direction. Conversely, when the first chamber is drained of fluid and the second chamber is filled with pressurized fluid, the impeller may be urged to rotate in an opposite direction. The flow rate of fluid into and out of the first and second chambers may determine an output rotational velocity of swing motor 43, while a pressure differential across the impeller may determine an output torque.

Drive system 16 may include one or more traction devices that propel work machine 10. In one example, drive system 16 includes a left track 40L located on one side of work machine 10 and a right track 40R located on an opposing side of work machine 10. Left track 40L may be driven by a left travel motor 42L, while right track 40R may be driven by a right travel motor 42R. It is contemplated that drive system 16 could alternatively include traction devices other than tracks such as wheels, belts, or any other known traction devices. In the example of FIG. 1, work machine 10 may be steered by generating a speed difference between left and right travel motors 42L, 42R, while straight travel may be facilitated by generating substantially equal output speeds from left and right travel motors 42L, 42R.

Similar to swing motor 43, each of left and right travel motors 42L, 42R may be driven by a fluid pressure differential. Specifically, each of left and right travel motors 42L, 42R may include first and second chambers (not shown) located to either side of an impeller (not shown). When the first chamber is filled with pressurized fluid and the second chamber is drained of fluid, the respective impeller may be urged to rotate in a first direction. Conversely, when the first chamber is drained of fluid and the second chamber is filled with pressurized fluid, the respective impeller may be urged to rotate in an opposite direction. The flow rate of fluid into and out of the first and second chambers may determine an output rotational velocity of left and right travel motors 42L, 42R, while a pressure differential across the impeller may determine an output torque.

Power source 18 may embody an engine such as, for example, a diesel engine, a gasoline engine, a gaseous fuel-powered engine, or any other type of combustion engine known in the art. It is contemplated that power source 18 may alternatively embody a non-combustion source of power such as a fuel cell, a power storage device, or another source known in the art. Power source 18 may produce a mechanical or electrical power output that may then be converted to hydraulic power for moving hydraulic cylinders 26, 32, 34 and left travel, right travel, and swing motors 42L, 42R, 43.

Operator station 20 may be configured to receive input from a work machine operator indicative of a desired work tool and/or work machine movement. Specifically, operator station 20 may include one or more operator interface devices 46 embodied as single or multi-axis joysticks located to the sides of an operator seat. Operator interface devices 46 may embody proportional-type controllers configured to position and/or orient work tool 14 by producing a work tool position signal that is indicative of a desired work tool velocity. Likewise, the same or another operator interface device 46 may be configured to position and/or orient work machine 10 relative to work surface 24 by producing a work machine position signal indicative of a desired work machine velocity. It is contemplated that different operator interface devices may alternatively or additionally be included within operator station 20 such as, for example, wheels, knobs, push-pull devices, switches, pedals, and other operator interface devices known in the art.

Figure 2:
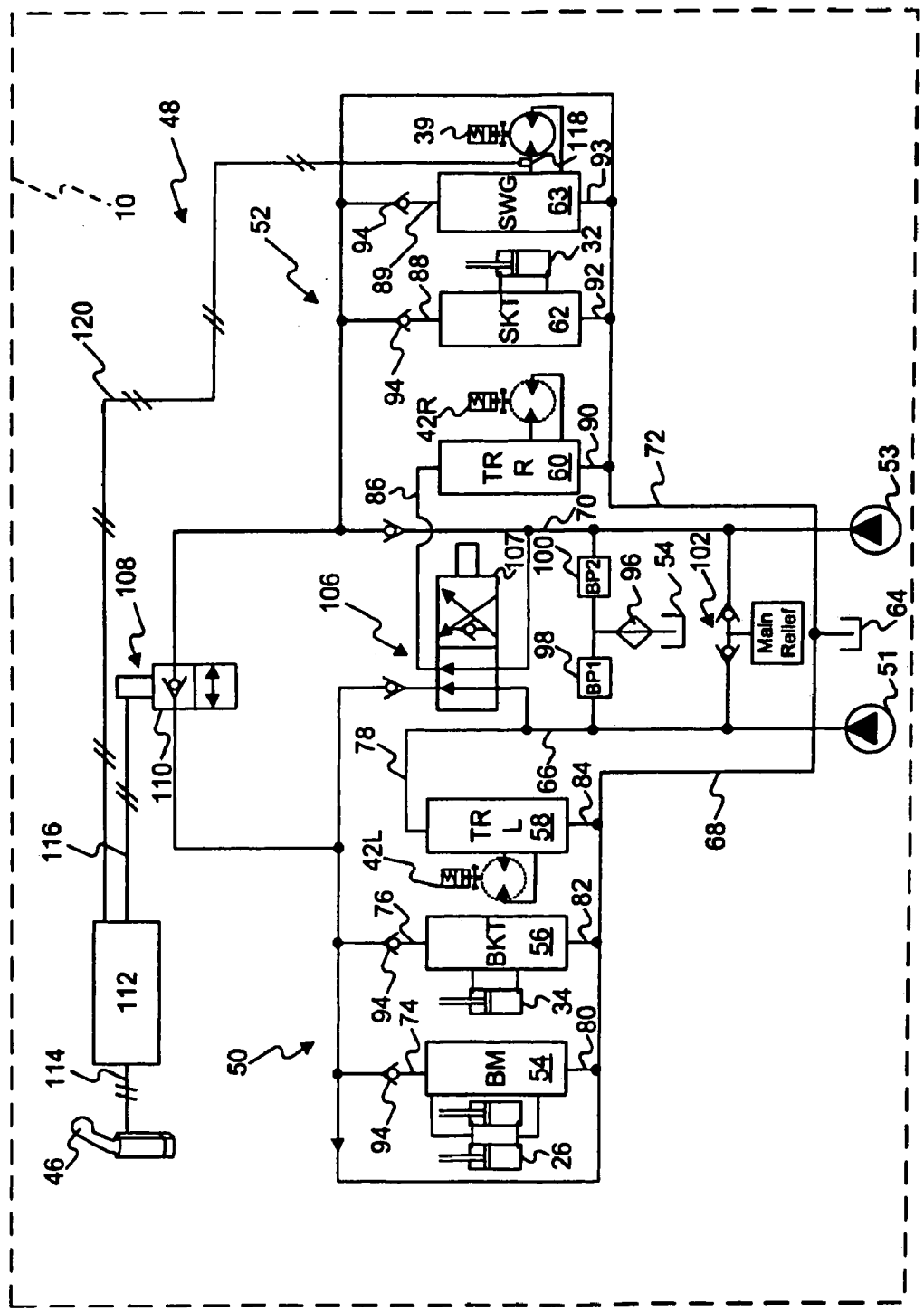
FIG. 2 is a schematic illustration of an exemplary disclosed hydraulic control system for the work machine of FIG. 1.

As illustrated in FIG. 2, work machine 10 may include a hydraulic control system 48 having a plurality of fluid components that cooperate to move work tool 14 (referring to FIG. 1) and work machine 10. In particular, hydraulic control system 48 may include a first circuit 50 configured to receive a first stream of pressurized fluid from a first source 51, and a second circuit 52 configured to receive a second stream of pressurized fluid from a second source 53. First circuit 50 may include a boom control valve 54, a bucket control valve 56, and a left travel control valve 58 connected in parallel to receive the first stream of pressurized fluid. Second circuit 52 may include a right travel control valve 60, a stick control valve 62, and a swing control valve 63 connected in parallel to receive the second stream of pressurized fluid. It is contemplated that additional control valve mechanisms may be included within first and/or second circuits 50, 52 such as, for example, one or more attachment control valves and other suitable control valve mechanisms.

First and second sources 51, 53 may be configured to draw fluid from one or more tanks 64 and pressurize the fluid to predetermined levels. Specifically, each of first and second sources 51, 53 may embody a pumping mechanism such as, for example, a variable displacement pump, a fixed displacement pump, or any other source known in the art. First and second sources 51, 53 may each be separately and drivably connected to power source 18 of work machine 10 by, for example, a countershaft (not shown), a belt (not shown), an electrical circuit (not shown), or in any other suitable manner. Alternatively, each of first and second sources 51, 53 may be indirectly connected to power source 18 via a torque converter, a reduction gear box, or in any other suitable manner. First source 51 may produce the first stream of pressurized fluid independent of the second stream of pressurized fluid produced by second source 53. The output of first and second sources 51, 53 may be at different pressure levels and flow rates and determined at least in part by the pressures of the fluid within first and second circuits 50, 52.

Tank 64 may constitute a reservoir configured to hold a supply of fluid. The fluid may include, for example, a dedicated hydraulic oil, an engine lubrication oil, a transmission lubrication oil, or any other fluid known in the art. One or more hydraulic systems within work machine 10 may draw fluid from and return fluid to tank 64. It is contemplated that hydraulic control system 48 may be connected to multiple separate fluid tanks or to a single tank.

Each of boom, bucket, right travel, left travel, stick, and swing control valves 54-63 may regulate the motion of their related fluid actuators. Specifically, boom control valve 54 may have elements movable to control the motion of hydraulic cylinders 26 associated with boom member 22; bucket control valve 56 may have elements movable to control the motion of hydraulic cylinder 34 associated with work tool 14; stick control valve 62 may have elements movable to control the motion of hydraulic cylinder 32 associated with stick member 28; and swing control valve 63 may have elements movable to control the swinging motion of frame member 38 about vertical axis 41. Likewise, left travel control valve 58 may have valve elements movable to control the motion of left travel motor 42L, while right travel control valve 60 may have elements movable to control the motion of right travel motor 42R.

The control valves of first and second circuits 50, 52 may allow pressurized fluid to flow to and drain from their respective actuators via common passageways. Specifically, the control valves of first circuit 50 may be connected to first source 51 by way of a first common supply passageway 66, and to tank 64 by way of a first common drain passageway 68. The control valves of second circuit 52 may be connected to second source 53 by way of a second common supply passageway 70, and to tank 64 by way of a second common drain passageway 72. Boom, bucket, and left travel control valves 54-58 may be connected in parallel to first common supply passageway 66 by way of individual fluid passageways 74, 76, and 78, respectively, and in parallel to first common drain passageway 68 by way of individual fluid passageways 80, 82, and 84, respectively. Similarly, right travel, stick, and swing control valves 60-63 may be connected in parallel to second common supply passageway 70 by way of individual fluid passageways 86, 88, and 89, respectively, and in parallel to second common drain passageway 72 by way of individual fluid passageways 90, 92, and 93, respectively. A check valve element 94 may be disposed within each of fluid passageways 74-78, 88, and 89 to provide for unidirectional supply of pressurized fluid to the control valves.

Because the elements of boom, bucket, right travel, left travel, stick, and swing control valves 54-63 may be similar and function in a related manner, only the operation of swing control valve 63 will be discussed in this disclosure. In one example, swing control valve 63 may include a first chamber supply element (not shown), a first chamber drain element (not shown), a second chamber supply element (not shown), and a second chamber drain element (not shown). The first and second chamber supply elements may be connected in parallel with fluid passageway 89 to fill their respective chambers with fluid from second source 53, while the first and second chamber drain elements may be connected in parallel with fluid passageway 93 to drain the respective chambers of fluid. To rotate swing motor 43 in a first direction, first chamber supply element may be moved to allow the pressurized fluid from second source 53 to fill the first chamber of swing motor 43 with pressurized fluid via fluid passageway 89, while the second chamber drain element may be moved to drain fluid from the second chamber of swing motor 43 to tank 64 via fluid passageway 93. To rotate swing motor 43 in the opposite direction, the second chamber supply element may be moved to fill the second chamber of swing motor 43 with pressurized fluid, while the first chamber drain element may be moved to drain fluid from the first chamber of swing motor 43. It is contemplated that both the supply and drain functions may alternatively be performed by a single element associated with the first chamber and a single element associated with the second chamber.

The supply and drain elements may be solenoid movable against a spring bias in response to a commanded flow rate. In particular, hydraulic cylinders 26, 32, 34 and left travel, right travel, and swing travel motors 42L, 42R, and 43 may move at a velocity that corresponds to the flow rate of fluid into and out of the first and second chambers. To achieve the operator-desired velocity indicated via the interface device position signal, a command based on an assumed or measured pressure may be sent to the solenoids (not shown) of the supply and drain elements that causes them to open an amount corresponding to the necessary flow rate. The command may be in the form of a flow rate command or a valve element position command.

The common supply and drain passageways of first and second circuits 50, 52 may be interconnected for makeup and relief functions. In particular, first and second common supply passageways 66, 70 may receive makeup fluid from tank 64 by way of a common filter 96 and first and second bypass elements 98, 100, respectively. As the pressure of the first or second streams drops below a predetermined level, fluid from tank 64 may be allowed to flow into first and second circuits 50, 52 by way of common filter 96 and first and second bypass elements 98, 100. In addition, first and second common drain passageways 68, 72 may relieve fluid from first and second circuits 50, 52 to tank 64 by way of a shuttle valve 102 and common main relief element 104. As fluid within first or second circuits 50, 52 exceeds a predetermined level, fluid from the circuit having the excessive pressure may drain to tank 64 by way of shuttle valve 102 and common main relief element 104.

A straight travel valve 106 may selectively rearrange left and right travel control valves 58, 60 into a series relationship with each other. In particular, straight travel valve 106 may include a valve element 107 movable from a neutral position toward a straight travel position. When valve element 107 is in the neutral position, left and right travel control valves 58, 60 may be independently supplied with pressurized fluid from first and second sources 51, 53, respectively, to control left and right travel motors 42L, 42R separately. When valve element 107 is in the straight travel position, left and right travel control valves 58, 60 may be connected in series to receive pressurized fluid from only first source 51 for dependent movement. When only travel commands are active (e.g., no implement commands are active, valve element 107 may be in the neutral position. If loading of left and right travel motors 42L, 42R is unequal (i.e., left track 40L is on soft ground while right track 40R is on concrete), the separation of first and second sources 51, 53 via straight travel valve 106 may provide for straight travel, even with differing output pressures from first and second sources 51, 53. Straight travel valve 106 may be actuated to support implement control during travel of work machine 10. For example, if an operator actuates boom control valve 54 during travel of work machine 10, valve element 107 of straight travel valve 106 may move to supply left and right travel motors 42L, 42R with pressurized fluid from first source 51 while boom control valve 54 may receive pressurized fluid from second source 53. Any excess fluid not used by boom control valve 54 may be supplied to left and right travel motors 42L, 42R via a check valve integral with straight travel valve 106.

When valve element 107 of straight travel valve 106 is moved to the straight travel position, fluid from second source 53 may be substantially simultaneously directed via valve element 107 through both first and second circuits 50, 52 to drive hydraulic cylinders 26, 32, 34. The second stream of pressurized fluid from second source 53 may be directed to hydraulic cylinders 26, 32, 34 of both first and second circuits 50, 52 because all of the first stream of pressurized fluid from first source 51 may be nearly completely consumed by left and right travel motors 42L, 42R during straight travel of work machine 10.

A combiner valve 108 may combine the first and second streams of pressurized fluids from first and second common supply passageways 66, 70 for high speed movement of one or more fluid actuators. In particular, combiner valve 108 may include a valve element 110 movable between a neutral position and a bidirectional flow-passing position. When in the neutral position, fluid from first circuit 50 may be allowed to flow into second circuit 52 in response to the pressure of first circuit 50 being greater than the pressure within second circuit 52 by a predetermined amount. The predetermined amount may be related to a spring bias and fixed during a manufacturing process. In this manner, when a right travel or stick function requires a rate of fluid flow greater than an output capacity of second source 53 and the pressure within second circuit 52 begins to drop, fluid from first source 51 may be diverted to second circuit 52 by way of valve element 110. When in the bidirectional flow-passing position, the second stream of pressurized fluid may be allowed to flow to first circuit 50 to combine with the first stream of pressurized fluid directed to control valves 54-58.

Hydraulic control system 48 may also include a controller 112 in communication with operator interface device 46, combiner valve 108, and with the supply and drain elements of control valves 54-63. Specifically, controller 112 may be in communication with operator interface device 46 by way of a communication line 114, with combiner valve 108 by way of a communication line 116, and with the supply and drain elements of control valves 54-63 via additional communication lines (not shown). It is contemplated that controller 112 may be in communication with other components of hydraulic control system 48 such as, for example, first and second sources 51, 53, common main relief element 104, first and second bypass elements 98, 100, straight travel valve 106, and other such components of hydraulic control system 48.

Controller 112 may embody a single microprocessor or multiple microprocessors that include a means for controlling an operation of hydraulic control system 48. Numerous commercially available microprocessors can be configured to perform the functions of controller 112. It should be appreciated that controller 112 could readily be embodied in a general work machine microprocessor capable of controlling numerous work machine functions. Controller 112 may include a memory, a secondary storage device, a processor, and any other components for running an application. Various other circuits may be associated with controller 112 such as power supply circuitry, signal conditioning circuitry, solenoid driver circuitry, and other types of circuitry.

One or more maps relating the interface device position signal, desired velocity, associated flow rates, valve element position, sensitivity variables, boost gain factors, and/or additional characteristics of hydraulic cylinders 26, 32, 34, and left travel, right travel, and swing motors 42L, 42R, 43 may be stored in the memory of controller 112. Each of these maps may include a collection of data in the form of tables, graphs, and/or equations. In one example, desired velocity and commanded flow rate may form the coordinate axis of a 2-D table for control of the first and second chamber supply elements. The commanded flow rate required to move the fluid actuators at the desired velocity and valve element position of the appropriate supply element may be related in another separate 2-D map or together with desired velocity in a single 3-D map. It is also contemplated that desired velocity may be directly related to the valve element position in a single 2-D map. Controller 112 may be configured to allow the operator to directly modify these maps and/or to select specific maps from available relationship maps stored in the memory of controller 112 to affect fluid actuator motion. It is contemplated that the maps may also be selectable based on modes of work machine operation.

Controller 112 may be configured to receive input from operator interface device 46 and to command operation of control valves 54-63 in response to the input and the relationship maps described above. Specifically, controller 112 may receive the interface device position signal indicative of a desired velocity and reference the selected and/or modified relationship maps stored in the memory of controller 112 to determine flow rate values and/or associated positions for each of the supply and drain elements within control valves 54-62. The flow rates or positions may then be commanded of the appropriate supply and drain elements to cause filling of the first or second chambers at a rate that results in the desired work tool velocity.

Controller 112 may further be configured to scale down the flow rate values commanded of one or more of control valves 54-63 to improve controllability of the associated fluid actuators. One of the inputs used to scale down the flow rates may include a pressure of the fluid supplied to any one of hydraulic cylinders 26, 32, 34, and left travel, right travel, and swing motors 42L, 42R, 43. For example, a pressure sensor 118 may be associated with swing motor 43 to generate a signal indicative of the pressure of fluid supplied to swing motor 43 (e.g., Swing Load Pressure). Controller 112 may receive the signal from pressure sensor 118 via a communication line 120 and determine a ratio of the Swing Load Pressure to a Swing Force Modulation Stall Pressure (e.g., the pressure at which second source 53 stalls) according to Eq. 1 below:

$$P_r = \frac{P_{load}}{P_{FMS}} \qquad \text{Eq. 1}$$

wherein:
$P_r$ is the Pressure Ratio;
$P_{load}$ is the Swing Load Pressure; and
$P_{FMS}$ is the Swing Force Modulation Stall Pressure.

Figure 3:
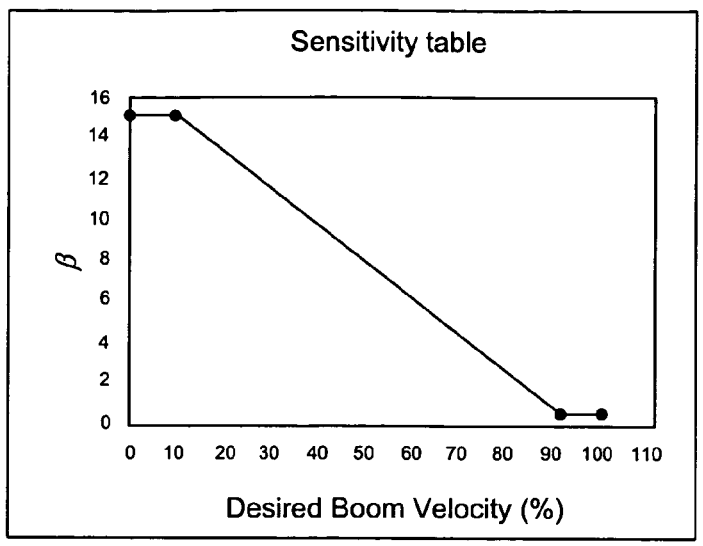
FIG. 3 is a graph illustrating an exemplary disclosed relationship for the hydraulic control system of FIG. 2.

Another of the inputs used to scale down the flow rate values commanded of control valves 54-63 may include a sensitivity factor β. In particular, controller 112 may reference one of the maps stored in the memory of controller 112 to determine the sensitivity factor β based on a desired velocity for boom member 22. Although in the current example, controller 112 may reference the exemplary map of FIG. 3, which relates a desired velocity of boom member 22 to the sensitivity factor β, it is contemplated that other relationship maps may alternatively be referenced to determine the sensitivity factor β and that the relationships contained within the maps may or may not be associated with boom member 22.

Controller 112 may use the sensitivity factor β, along with the pressure ratio $P_r$ determined from Eq. 1 above to calculate a scaling factor SF according to Eq. 2 below $$SF = (1 - P_r^\beta) \qquad \text{Eq. 2}$$

wherein:
SF is the Scaling Factor;
$P_r$ is the Pressure Ratio; and
β is the Sensitivity Factor.

The scaling factor SF may then applied to the Desired Flow Rate commanded of swing control valve 63 according the Eq. 3 below:

$$Q_{scaled} = Q_{des} * SF \qquad \text{Eq. 3}$$

wherein:
$Q_{scaled}$ is the Scaled Flow Rate;
$Q_{des}$ is the Desired Flow Rate; and
SF is the Scaling Factor.

Figure 4:
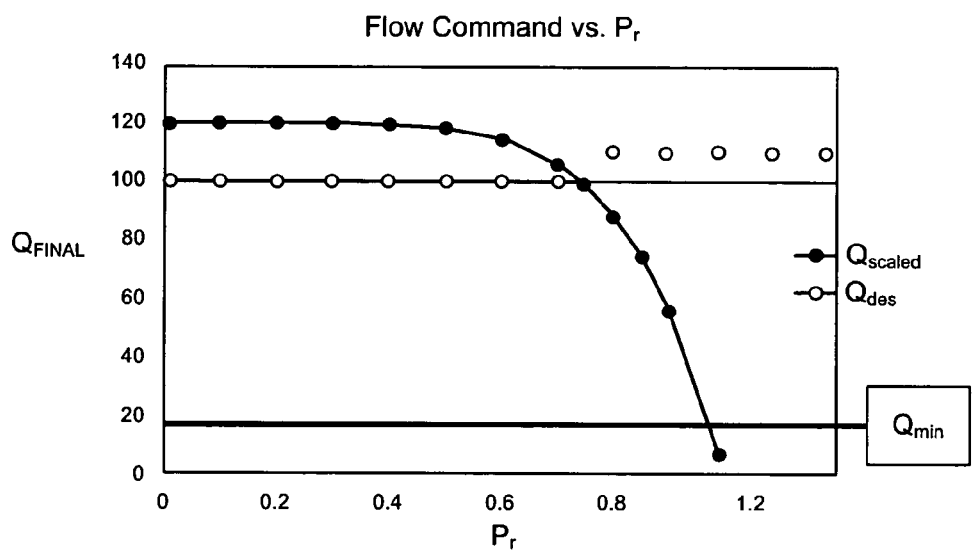
FIG. 4 is a graph illustrating another exemplary disclosed relationship for the hydraulic control system of FIG. 2.

As illustrated in FIG. 4, the Scaled Flow Rate may be commanded of swing control valve 63, only if the scaled flow rate $Q_{scaled}$ remains within one or more predetermined limits. In particular, FIG. 4 includes a first curve 122 representing the desired flow rate $Q_{des}$, a second curve 124 representing the scaled flow rate $Q_{scaled}$, and a third curve 126 representing a minimum flow rate $Q_{min}$. If scaling is implemented and the scaled flow rate $Q_{scaled}$ is between the desired flow rate $Q_{des}$ and the minimum flow rate $Q_{min}$, then the scaled flow rate $Q_{scaled}$ may be commanded of swing control valve 63. Otherwise, the closer of the desired flow rate $Q_{des}$ and the minimum flow rate $Q_{min}$ may be commanded of swing control valve 63.

The desired flow rate $Q_{des}$ may be boosted, if preferred, prior to the scaling described above to facilitate timing of the pivoting motions of boom member 22 and frame member 38. In particular, before scaling the desired flow rate $Q_{des}$, controller 112 may first reference another map stored in the memory of controller 112 to determine a boost gain factor BGF. Although in the current example, controller 112 may reference the exemplary map of FIG. 5, which relates a desired velocity of boom member 22 to the boost gain factor BGF, it is contemplated that other relationships and/or relationship maps may alternatively be referenced to determine the boost gain factor BGF. The boost gain factor BGF may then be applied to the desired flow rate $Q_{des}$ prior to scaling according to Eq. 4 below:

$$Q_{scaled} = (BGF * Q_{des}) * SF \qquad \text{Eq. 4}$$

wherein:
$Q_{scaled}$ is the Scaled Flow Rate;
BGF is the Boost Gain Factor;
$Q_{des}$ is the Desired Flow Rate; and
SF is the Scaling Factor.

Figure 5:
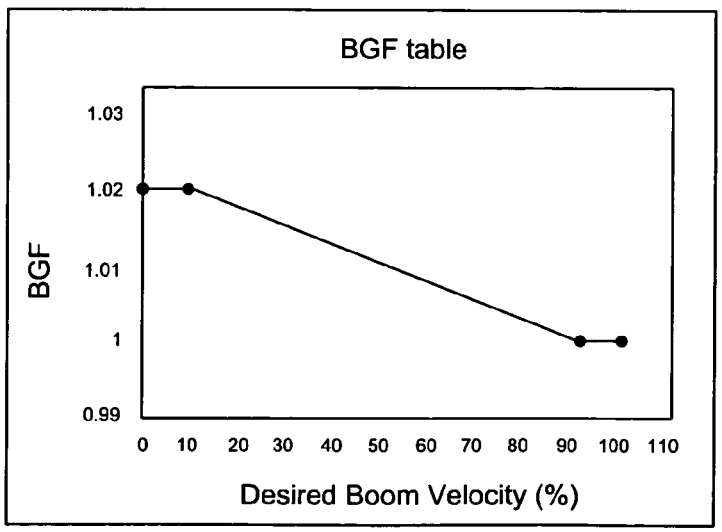
FIG. 5 is a graph illustrating another exemplary disclosed relationship for the hydraulic control system of FIG. 2.

As illustrated in FIG. 5, the boost gain factor BGF may function to increase the flow rate beyond the desired flow rate $Q_{des}$ at low values of desired boom velocity. Specifically, at desired velocities of boom member 22 less than about 90% of a maximum boom velocity, the boost gain factor BGF may increase the flow rate beyond the desired flow rate $Q_{des}$.

Figure 6:
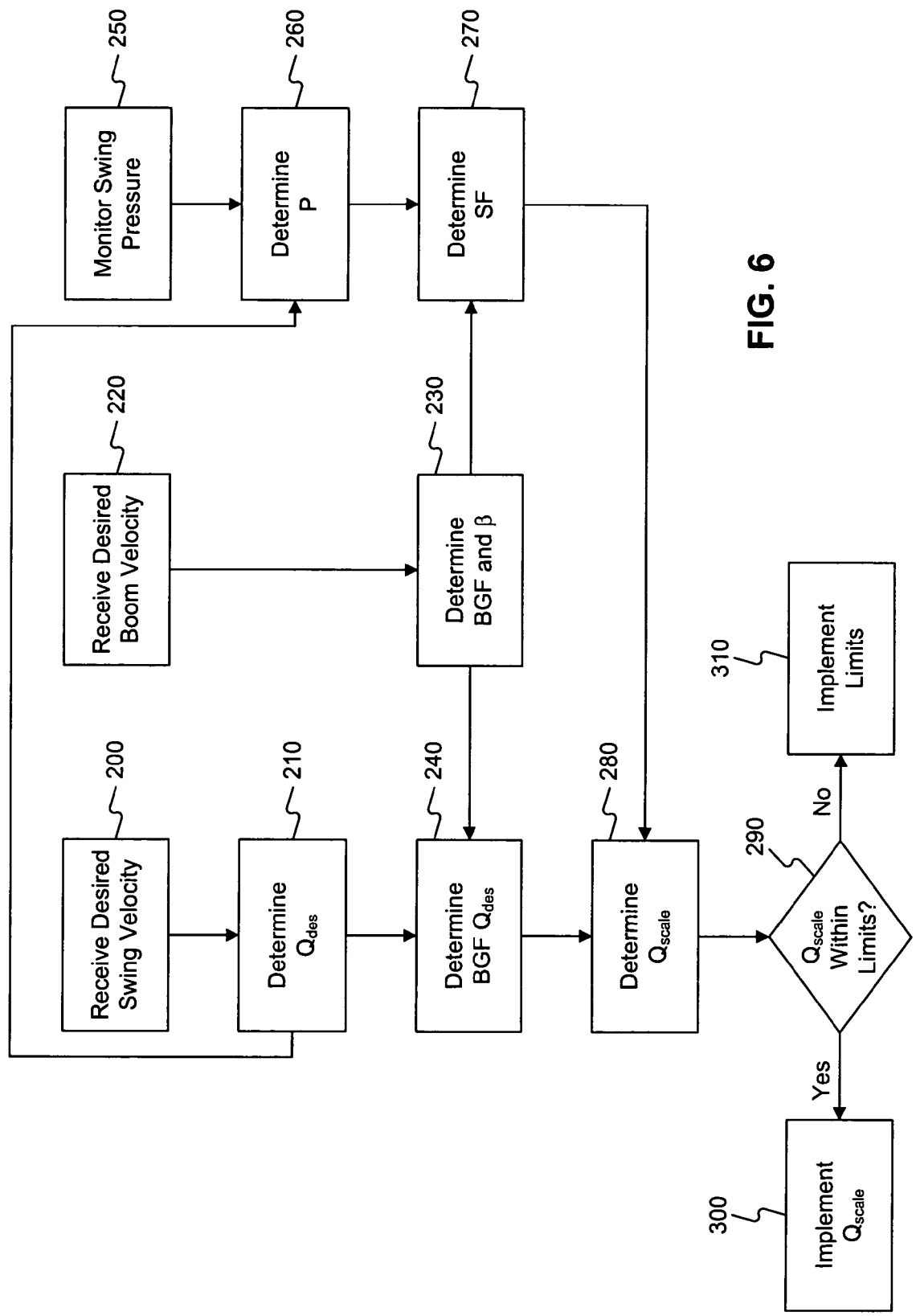
FIG. 6 is a flow chart illustrating an exemplary disclosed method of operating the control system of FIG. 2.

FIG. 6 illustrates an exemplary method of operating hydraulic control system 48. FIG. 6 will be discussed in the following section to further illustrate the disclosed system and its operation.

INDUSTRIAL APPLICABILITY

The disclosed hydraulic control system may be applicable to any work machine that includes multiple fluid actuators where velocity predictability under varying loads and operational modes is desired. The disclosed hydraulic control system may improve operator control by scaling down the flow rate of pressurized fluid commanded of any one single fluid actuator based on the pressure of the fluid supplied to the actuator and the operation of other fluid actuators within the same system. The operation of hydraulic control system 48 will now be explained.

During operation of work machine 10, a work machine operator may manipulate operator interface device 46 to cause a movement of work tool 14. The actuation position of operator interface device 46 may be related to an operator-expected or desired velocity of work tool 14 and/or work machine 10. Operator interface device 46 may generate a position signal indicative of the operator-expected or desired velocity during manipulation and send this position signal to controller 112.

Controller 112 may receive input during operation of hydraulic cylinders 26, 32, and 34 and left and right travel motors 42L, 42R, and make determinations based on the input. Specifically, controller 112 may receive the operator interface device position signal and determine desired velocities for each fluid actuator within hydraulic control system 48, and the corresponding flow rates. These corresponding flow rates may then be commanded of actuator control valves 54-63 to move the associated fluid actuators at the desired velocity.

During operation of work machine 10, there may be situations where the movement of a member of linkage system 12 is restricted. For example, as frame member 38 is swung about vertical axis 41 with respect to undercarriage member 39, any one of boom member 22, stick member 28, or bucket 14 could come into contact with an obstacle. Once the obstacle has been contacted, the pressure of the fluid supplied to swing motor 43 may rise abruptly. In addition, during initiation of the swinging motion, the inertia associated with frame member 38, operator station 20, and connected implement system 12 may also cause an abrupt rise in the pressure of the fluid supplied to swing motor 43. If left unchecked, this pressure rise could be abrupt enough that the maximum pressure threshold is quickly exceeded, leaving the operator without the ability to modulate the force or speed of the swinging motion. In addition, because the second stream of pressurized fluid from second source 53 is regulated based on the single highest pressure within second circuit 52, the output of second source 53 may be quickly reduced in response the abrupt rise in pressure. This output reduction could undesirably reduce the velocity of the remaining fluid actuators receiving pressurized fluid from second source 53.

In order to provide fine controllability over the fluid actuator movements of implement system 12 and to provide predictable speed modulation during situations of restricted movement or during the initial movements of high-inertia components, the flow rates commanded of actuator control valves 54-63 may be scaled down according to the exemplary method illustrated in the flow chart of FIG. 6. As illustrated in FIG. 6, the first steps in commanding a scaled down flow rate may include controller 112 receiving a desired swing velocity (Step 200) and determining a corresponding desired flow rate $Q_{des}$ (Step 210). The desired swing velocity may be received via operator input device 46, while the corresponding desired flow rate may be determined by referencing the desired velocity with one of the relationship maps stored within the memory of controller 112.

Simultaneous to, prior to, or following step 200, controller 112 may receive a desired velocity of boom member 22 (Step 220) and determine the boost gain factor BGF, if boosting is preferred, and the sensitivity factor β (Step 230). The boost gain factor BGF may be determined by comparing the desired velocity of boom member 22 to a maximum boom velocity and referencing the comparison to the Gain Boost table of FIG. 5. The sensitivity factor β may be determined by referencing the same comparison to the Sensitivity table of FIG. 3. After determining the boost gain factor BGF, controller 112 may apply the boost gain factor BGF to the desired flow rate $Q_{des}$ to determine the boosted desired flow rate BGF*$Q_{des}$ (Step 240).

Simultaneous to, prior to, or following step 200, controller 112 may monitor the swing pressure associated with swing motor 43 (Step 250). It is contemplated that the pressure associated with swing motor 43 may be monitored via pressure sensor 118 on a continuous basis or only when prompted by controller 112. The monitored pressure may then be used to calculate the pressure ratio $P_r$ according to Eq. 1 described above (Step 260). After determining the pressure ratio $P_r$, the scaling factor SF may be calculated according to Eq. 2 above (Step 270).

Once the scaling factor SF has been calculated, the final scaled flow rate $Q_{scaled}$ may be determined according to Eq. 4 above (Step 280) and commanded of swing control valve 63. However, as illustrated in FIG. 4, one or more limitations may affect the application of the final scaled flow rate $Q_{scaled}$. Specifically, controller may determine if the final scaled flow rate $Q_{scaled}$ (represented by curve 124 in FIG. 4) exceeds the original desired flow rate $Q_{des}$ (represented by curve 122) or is below the minimum limit flow rate $Q_{min}$ (represented by curve 126) (Step 290). If the final scaled flow rate $Q_{scaled}$ exceeds the original desired flow rate $Q_{des}$, the original desired flow rate $Q_{des}$ may instead be commanded of swing control valve 63 (Step 300). Similarly, if the final scaled flow rate $Q_{scaled}$ is below the minimum limit flow rate $Q_{min}$, the minimum limit flow rate $Q_{min}$ may instead be commanded of swing control valve 63 (Step 310).

The control strategy and hardware of hydraulic control system 48 may improve the efficiency of work machine 10. Specifically, during a boom operation requiring a flow rate exceeding the capacity of first source 51, excess flow from second source 53 may be diverted to first circuit 50. During this diversion of excess flow, any flow capacity of second source 53 exceeding the scaled down flow rate $Q_{scaled}$ of swing motor 43 may be made available to move boom member 22. Because the excess capacity of second source 53 is made available to the fluid actuators of first circuit 50 rather than wasted as a means of controlling the pressure of swing motor 43, the efficiency of work machine 10 may be improved.

Because the flow rate of fluid supplied to swing motor 43 may be scaled down according to pressure, controllability over the swinging motion of work machine 10 may be enhanced. In particular, as the pressure of the fluid supplied to swing motor 43 approaches the stall pressure of second source 53, the flow rate of fluid supplied to swing motor 43 may be increasingly reduced. This reduction in flow rate may lengthen the time period over which the pressure supplied to swing motor 43 increases, thereby allowing the operator of work machine 10 extended modulation over the operation of swing motor 43.

Further, because the scaling function of controller 112 may be electronically implemented, enhanced tuning of hydraulic system 48 may be available at a reduced cost. Specifically, the sensitivity factor β, boost gain factor BGF, and the various relationship maps stored within the memory of controller 112 may be modified and/or replaced to accommodate differing operational situations, without the expense and time associated with hardware changes.

It will be apparent to those skilled in the art that various modifications and variations can be made to the disclosed hydraulic control system. Other embodiments will be apparent to those skilled in the art from consideration of the specification and practice of the disclosed hydraulic control system. It is intended that the specification and examples be considered as exemplary only, with a true scope being indicated by the following claims and their equivalents.

What is claimed is:

1. A hydraulic control system, comprising:
    a fluid actuator;
    a supply of pressurized fluid;
    a control valve movable to selectively pass pressurized fluid from the supply to the fluid actuator;
    a sensor configured to sense the pressure of the pressurized fluid passed to the fluid actuator; and
    a controller in communication with the control valve and the sensor, the controller configured to:
        receive an input indicative of a desired velocity of the fluid actuator;

determine a fluid flow rate corresponding to the desired velocity;
determine a ratio of the sensed pressure to a stall pressure of the supply;
scale down the determined flow rate an amount based on the determined ratio; and
move the control valve an amount corresponding to the scaled down flow rate.

2. The hydraulic control system of claim 1, wherein:
the fluid actuator is a first fluid actuator;
the hydraulic control system further includes a second fluid actuator;
the controller is further configured to receive an input indicative of a desired velocity of the second fluid actuator; and
the scaled down amount is further based on the input indicative of a desired velocity of the second fluid actuator.

3. The hydraulic control system of claim 2, wherein the controller includes a memory having stored therein a map relating the input indicative of a desired velocity of the second fluid actuator to a sensitivity variable.

4. The hydraulic control system of claim 3, wherein the scaled down amount is an exponential function of the pressure ratio and the sensitivity variable.

5. The hydraulic control system of claim 3, wherein:
the map includes at least one limit;
the scaled down amount is an exponential function of the pressure ratio and the sensitivity variable; and
the controller is configured to move the control valve the amount corresponding to the scaled down flow rate if the scaled down flow rate remains within the at least one limit and to move the control valve an amount corresponding to the at least one limit if the scaled down flow rate does not remain within the at least one limit.

6. The hydraulic control system of claim 2, wherein the controller is further configured to boost the determined flow rate an amount based on the input indicative of a desired velocity of the second fluid actuator.

7. The hydraulic control system of claim 6, wherein the controller is configured to boost the determined flow rate only when the input indicative of a desired velocity of the second fluid actuator is below a predetermined amount of a maximum velocity.

8. The hydraulic control system of claim 7, wherein the predetermined amount is about 90%.

9. The hydraulic control system of claim 2, wherein:
the supply of pressurized fluid is a first supply of pressurized fluid; and
the hydraulic control system further includes:
a second supply of pressurized fluid; and
a second control valve movable to selectively pass pressurized fluid from the second supply to the second fluid actuator, wherein
the difference between the determined fluid flow rate and the scaled down fluid flow rate from the first supply is made available to the second fluid actuator.

10. The hydraulic control system of claim 2, wherein:
the first fluid actuator is a hydraulic motor associated with a swinging frame member; and
the second fluid actuator is a hydraulic cylinder associated with a boom member.

11. A method of operating a hydraulic control system, comprising:
pressurizing a fluid;
directing the pressurized fluid to a fluid actuator;
sensing the pressure of the fluid directed to the fluid actuator;
receiving an input indicative of a desired velocity of the fluid actuator;
determining a fluid flow rate corresponding to the desired flow rate;
determining a ratio of the sensed pressure to a stall pressure;
scaling down the determined flow rate an amount based on the determined ratio; and
moving a control valve associated with the fluid actuator an amount corresponding to the scaled down flow rate.

12. The method of claim 11, wherein:
the fluid actuator is a first fluid actuator;
the method further includes receiving an input indicative of a desired velocity of a second fluid actuator; and
the scaled down amount is further based on the input indicative of a desired velocity of a second fluid actuator.

13. The method of claim 12, further including determining a sensitivity variable based on the input indicative of a desired velocity of the second fluid actuator, wherein the scaled down amount is an exponential function of the pressure ratio and the sensitivity variable.

14. The method of claim 12, further including boosting the determined flow rate an amount based on the input indicative of a desired velocity of the second fluid actuator.

15. The method of claim 14, wherein boosting includes boosting the determined flow only when the input indicative of a desired velocity of the second fluid actuator is below a predetermined amount of a maximum velocity.

16. The method of claim 15, wherein the predetermined amount is about 90%.

17. The method of claim 12, wherein:
pressurizing a fluid includes operating a first supply to pressurize a first stream of fluid and operating a second supply to pressurize a second stream of fluid;
directing the pressurized fluid to a fluid actuator includes directing the first stream of fluid to the first fluid actuator; and
the method further includes directing the second stream of pressurized fluid to the second fluid actuator, wherein the difference between the determined fluid flow rate and the scaled down fluid flow rate from the first stream of pressurized fluid is made available to the second fluid actuator.

18. A work machine, comprising:
a frame member;
an undercarriage member;
a hydraulic motor operatively connected to swing the frame member relative to the undercarriage member;
a first supply of pressurized fluid;
a first control valve movable to selectively pass pressurized fluid from the first supply to the hydraulic motor;
a boom member pivotally connected to the frame member;
a hydraulic cylinder configured to pivot the boom member relative to the frame member;
a second supply of pressurized fluid;
a second control valve movable to selectively pass pressurized fluid from the second supply to the hydraulic cylinder;
a sensor configured to sense a pressure of the pressurized fluid passed to the hydraulic motor; and
a controller in communication with first control valve, the second control valve, and the sensor, the controller configured to:

receive an input indicative of a desired velocity of the hydraulic motor;
determine a fluid flow rate corresponding to the desired velocity;
determine a ratio of the sensed pressure to a stall pressure of the first supply;
receive an input indicative of a desired velocity of the hydraulic cylinder;
scale down the determined flow rate an amount based on the determined ratio and the input indicative of a desired velocity of the hydraulic cylinder; and
move the first control valve an amount corresponding to the scaled down flow rate.

19. The work machine of claim 18, wherein:
the controller includes a memory having stored therein a map relating the input indicative of a desired velocity of the hydraulic cylinder to a sensitivity variable;
the scaled down amount is an exponential function of the pressure ratio and the sensitivity variable;
the map includes at least one limit; and
the controller is configured to move the first control valve an amount corresponding to the scaled down flow rate if the scaled down flow rate remains within the at least one limit and to move the first control valve an amount corresponding to the at least one limit if the scaled down flow rate does not remain within the at least one limit.

20. The work machine of claim 18, wherein the controller is further configured to boost the determined flow rate an amount based on the input indicative of a desired velocity of the hydraulic cylinder only when the input indicative of a desired velocity of the hydraulic cylinder is below about 90% of a maximum velocity.

21. The work machine of claim 18, wherein the difference between the determined fluid flow rate and the scaled down fluid flow rate from the first supply is made available to the hydraulic cylinder.

* * * * *